United States Patent [19]

Gray et al.

[11] Patent Number: 4,542,230
[45] Date of Patent: Sep. 17, 1985

[54] LIQUID CRYSTALS ESTERS

[75] Inventors: George W. Gray; David Lacey, both of Cottingham; Martin G. Pellatt, Wimborne; Bennett Sturgeon, Upminster, all of England

[73] Assignee: The Secretary of State for Defence in Her Britannic Majesty's Government of the United Kingdom of Great Britain and Northern Ireland, London, England

[21] Appl. No.: 192,557

[22] Filed: Sep. 30, 1980

[30] Foreign Application Priority Data

Oct. 2, 1979 [GB] United Kingdom ............... 7934127
Jun. 27, 1980 [GB] United Kingdom ............... 8021072

[51] Int. Cl.$^4$ ............................................. C07C 69/74
[52] U.S. Cl. ........................................ 560/01; 560/73; 560/109; 560/66; 252/299.65; 252/299.67; 350/350 R
[58] Field of Search .......................... 560/109, 73, 1; 252/299.65, 299.67

[56] References Cited

U.S. PATENT DOCUMENTS

| 3,876,286 | 4/1975 | Deutscher et al. | 252/299 |
| 3,976,591 | 8/1976 | Dubois et al. | 252/299 |
| 4,002,670 | 1/1977 | Steinstrasses | 560/109 |
| 4,228,029 | 10/1980 | Osmon | 252/299 |
| 4,229,315 | 10/1980 | Kraun et al. | 252/299 |
| 4,293,431 | 10/1981 | Deutscher | 252/299.6 |
| 4,368,135 | 1/1983 | Osmon | 560/1 |

FOREIGN PATENT DOCUMENTS

| 0023728 | 11/1981 | European Pat. Off. | |
| 86269 | 6/1970 | Fed. Rep. of Germany | 252/299 |
| 9055579 | 12/1974 | Japan | 252/299.67 |
| 4148184 | 12/1978 | Japan | 560/73 |

OTHER PUBLICATIONS

Gray, G. W. et al, Mol. Cryst. Liq. Cryst., vol. 67 (657–679) 1981.

Primary Examiner—Paul J. Killos
Attorney, Agent, or Firm—Stevens, Davis, Miller & Mosher

[57] ABSTRACT

A liquid crystal ester has a structure:

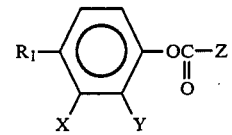

where X and Y are fluorine or hydrogen at least one being hydrogen, and Z is either:
(a)

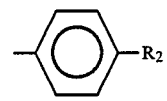

where $R_2$ is alkyl, alkoxy, alkylcarbonyloxy or alkoxycarbonyloxy
(b)

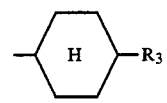

where $R_3$ is an alkyl group.

The ester may be prepared by a conventional esterification from the corresponding phenol

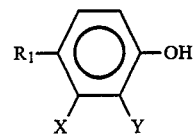

and the corresponding acid chloride Z—COCl.

The ester may be used in mixtures with other liquid crystal compounds for use in known electro-optic devices.

34 Claims, 3 Drawing Figures

LIQUID CRYSTALS ESTERS

The present invention relates to liquid crystal esters and materials and devices containing them.

The use of liquid crystal materials to exhibit electro-optic effects in display devices such as digital calculators or watches is now well known. One of the parameters of a liquid crystal material which is important in relation to electro-optical operation is the dielectric anisotropy ($\Delta\epsilon$) of the material. This is the difference, for a given frequency and temperature, between the average dielectric constant measured parallel ($\epsilon_\parallel$) to the long axis of the molecules of the material, eg when aligned together, less the average dielectric constant measured perpendicular ($\epsilon_\perp$) to the long axis of the molecules.

The sign and magnitude of the dielectric anisotropy of a given liquid crystal material is one of the major parameters which determine the kinds of electro-optic devices in which that material may be used.

For example, materials having a large positive dielectric anisotropy, herein referred to as 'strongly positive' materials may be used in known twisted nematic effect devices. For example mixtures of 4-alkyl- or -alkoxy-4'-cyanobiphenyls and a 4''-alkyl- or -alkoxy-cyano-p-terphenyl have achieved considerable commercial success in such applications.

Materials having a large negative dielectric anisotropy may for example (depending on other properties such as resistivity) be used in known dynamic scattering effect and cholesteric memory effect devices.

Materials having a small positive or negative dielectric anisotropy, herein referred to as 'weakly' positive or negative materials as appropriate, may be mixed with either strongly positive materials or strongly negative materials to modify the dielectric anisotropy.

For example weakly positive or negative materials are useful for blending with strongly positive materials for multiplexed twisted nematic effect devices. Furthermore, they may also be blended with strongly negative materials to form suitable mixtures for positive contrast guest-host devices. They may also be used in other known applications.

It is the purpose of the present invention (in one aspect) to provide liquid crystal compounds which are either weakly positive or weakly negative materials (preferably negative).

The sign and magnitude of the dielectric anisotropy of a liquid crystal material is determined (inter alia) by the resultant dipole moment of the molecules of the material which in turn is determined by the various substituents within the molecule. Positive materials have a resultant dipole moment along the long axis of the molecule, whilst negative materials possess a resultant dipole moment at right angles to the long axis of the molecule.

The known group of liquid crystals based on the ester structure (I) as given below in which the six membered ring A may be aromatic or saturated and in which both rings will carry appropriate substituents in the 4 and 4' positions, may show positive or negative dielectric anisotropy according to the degree of interactions of the 4 and 4' substituents with the dipole produced by the central carbonyl grouping.

Known weakly positive and negative esters having the structure as in structure (I) above are those in which the ring A is a benzene or cyclohexane ring and the substituents in the 4 and 4' positions are alkyl groups. These known esters, like many other liquid crystal materials, exhibit smectic liquid crystal phases or show tendencies to produce such phases at temperatures below their nematic ranges. Such smectic properties are undesirable particularly in applications where the materials are used in mixtures, eg for multiplexed devices as described in published UK Patent Application No. 78.36305, because they can give rise to large 'injected' smectic areas on the mixture composition phase diagram (composition plotted against temperature). Such areas can limit the working composition range on the phase diagram limiting the choice of compositions which may be employed in devices and consequently the ability of the device designer to adjust electro-optical properties by varying mixture composition.

It is an object of the present invention to provide weakly positive or negative esters showing, in general terms, reduced smectic behaviour as compared with the known esters mentioned above.

According to the present invention there is provided a liquid crystal ester compound having the following molecular structure:

formula (II)

where X and Y are fluorine or hydrogen at least one being fluorine, where $R_1$ is an alkyl group and Z is either:

(a)

where $R_2$ is an alkyl, alkoxy, alkylcarbonyloxy or alkoxycarbonyloxy group (b)

where $R_3$ is an alkyl group.

Preferably X=H and Y=F.

A compound (or compounds) having a molecular structure as in formula (II) will be referred to as a compound (or compounds), as defined.

The groups $R_1$, $R_2$ and $R_3$ preferably contain less than eighteen carbon atoms, eg one to ten carbon atoms, and may be normal or branched. If one of these groups is branched it may contain a chiral centre in which case the compound is optically active.

Preferably Z in formula (II) is either where $R_3'$ and $R_3''$ are alkyl groups.

By a 'liquid crystal compound' is meant a compound in one of the following two known categories:

(i) Compounds which normally exhibit a liquid crystal phase.

(ii) Compounds which do not normally exhibit a liquid crystal phase but which nevertheless usefully affect some aspect of liquid crystal behaviour when dissolved in other liquid crystal compounds.

Compounds in category (ii) show a 'monotropic' or virtual liquid crystal to isotropic liquid transition at a temperature below the melting point of their solid phase. The monotropic or virtual transition may be detected respectively by rapid cooling of the liquid phase or by dissolving the compound in a material exhibiting a liquid crystal phase, observing the change in the transition to the isotropic liquid phase of the material by the addition and calculating the virtual transition temperature by extrapolation.

Compounds in category (ii) might for example be usefully dissolved in other liquid crystal compounds to extend or vary the liquid crystal temperature ranges of the compounds or to vary the molecular helical pitch (in the case of 'cholesteric' liquid crystals).

Material which exhibits a liquid crystal phase and either consists of or contains a compound as defined above will be referred to herein as a material 'as defined'.

The liquid crystal phase exhibited by the material as defined may be nematic or cholesteric although the nematic phase is likely to be the most useful.

For a nematic phase the compound as defined should preferably have a normal alkyl group $R_1$ as well as a normal group $R_2$ or $R_3$ whilst for a cholesteric phase the compound as defined should preferably have a branched alkyl group containing a chiral centre in at least one of the groups $R_1$ and $R_2$ or $R_3$.

Compounds having formula (II) have been found to show, in general, reduced smectic tendencies, as compared with the known esters mentioned above.

The fact that compounds as defined (II) are liquid crystal (see below) is unexpected because the introduction of lateral substituents into the molecular structure usually diminishes the lateral attractions between the molecules which produce liquid crystal properties.

Preferably compounds as defined are prepared by reacting the acid chloride Z—COCl with the phenol in the case where where $R_2$ is an alkyl or alkoxy group or

The reaction may be carried out under conditions well known for esterification reactions.

A compound as defined may be mixed with one or more other compounds as defined to enhance its liquid crystal properties, eg to extend its liquid crystal temperature range or otherwise to modify the properties, eg the electrical properties of the liquid crystal phase in an advantageous manner.

For example the following are examples of such mixtures:

(i)

+

(ii)

+

(iii)

+ where $R_4$ to $R_{18}$ are various n-alkyl groups containing ten or less carbon atoms.

Likewise, compounds as defined may be mixed with one or more of the compounds in the following known categories:

or known laterally substituted derivatives of these compounds, where is a cyclohexane ring, is a bicyclo(2.2.2)octane ring,

X is (a 1,4 phenylene group , or)

(a 4,4' biphenylyl group , or)

(a 2,6 naphthyl group )

and $Y_1$ is CN, or $R^1$, or $OR^1$ or $CO.O—X—Y^1$ where $Y^1$ is CN, or $R^2$ or $OR^3$; the definition of $R^2$ is the same as that used earlier for $R_1$.

According to another aspect of the invention, an electro-optic liquid crystal device includes two adjacent plates at least one of which is optically transparent, a layer of liquid crystal material contained in the space between the plates wherein the liquid crystal material is the material as defined above, and deposited on the inner facing surfaces of the plates, electrodes to allow an electric field to be applied across the layer. The electro-optic device may for example be a display device used, for instance, in an instrument such as a time watch or clock. The device may be one of the following known kinds: twisted nematic effect; (cholesteric-to-nematic) phase change effect; Freedericksz effect; dynamic scattering effect; or cholesteric memory effect. It is well known to those skilled in the art how materials may be used in these various applications and it will be apparent to such persons how to prepare suitable materials depending on the applications.

Compounds as defined above are, in general, reasonably chemically and photochemically stable liquid crystal compounds which have a low dielectric anisotropy and low birefringence and, in the case where $Z =$  $R_3$, low viscosity.

The low birefringence makes the compounds as defined particularly useful for blending with other liquid crystal materials which together give a long helical pitch cholesteric material for use in (cholesteric-to-nematic) phase change effect devices (of either positive or negative contrast as explained below).

The small dielectric anisotropy makes the compounds as defined useful for blending with other materials to form mixtures having a reduced (positive or negative) dielectric anisotropy. Examples of materials and devices in which the compounds as defined may be used in this way are any of those given above. It is well known to those skilled in the art that the dielectric anisotropy of a mixture can be controlled by appropriate control of the relative proportions of the materials blended together to form the mixture.

The compounds as defined are particularly suitable for use in mixtures with positive dielectric anisotropy materials, eg cyanobiphenyls, for use in multiplexed twisted nematic devices. This use is further described in a copending UK Patent Application No 7934125.

Examples of the preparation and properties of compounds as defined above will now be given.

EXAMPLE 1

Preparation of compounds as defined above wherein

Z is

$R_2'$ = alkyl or alkoxy.

These compounds are preferably prepared by the esterification of the acid chlorides of the appropriate 4-n-alkyl- and -alkoxybenzoic acids (known) or trans-4-n-alkylcyclohexane-1-carboxylic acids (synthesised by standard synthetic methods) as appropriate together with the appropriate 4-n-alkyl-2- or -3-fluorophenols which are prepared (as described in copending UK Patent Application No 7934128) as follows:

(i)

(ii)

where R, R''' and R₁ are alkyl groups.

Thus the reaction pathway is preferably:

where B is a trans-cyclohexane ring, $R_1$ being n-alkyl, or where B is a phenyl ring, $R_2$ being n-alkyl or n-alkoxy.

The preparation of 4-n-pentyl 1-2-fluorophenyl 4'-n-butyloxybenzoate typifies the esterification procedure used to prepare these esters. This compound has been produced as follows.

STEP A1

4-n-butyloxybenzoic acid (0.0082M) was converted into the acid chloride using freshly distilled thionyl chloride (15 cm³).

STEP B1

To a cold, stirred solution of the acid chloride prepared in Step A1 in dry dichloromethane (15 cm³) was added, dropwise, a cold solution of 4-n-pentyl-2-fluorophenol (0.0082M) in dry dichloromethane (15 cm³) and triethylamine (10 cm³), keeping the temperature below 10° C. When the addition had been completed, the reaction mixture was heated under reflux, with stirring for 3 hr.

After cooling, the dichloromethane and triethylamine were distilled off, under reduced pressure, and ether was then added to the residue. The undissolved triethylamine hydrochloride was filtered off and the ethereal extract washed successively with 10% hydrochloric acid, 5% aqueous sodium carbonate, and water and finally dried ($Na_2SO_4$).

The crude residual ester was then column chromatographed on silica gel, eluting with chloroform (2): light petroleum (bp 60°–80°) (1). Several recrystallisations from ethanol gave the pentyl-2-fluorophenyl 4'-n-butyloxybenzoate as a colourless crystalline solid, 1.9 g (61% yield).

Esters such as 2-fluoro-4-n-pentylphenyl 4'-n-butylbenzoate and 2-fluoro-4-n-pentylphenyl trans-4'-n-butylcyclohexylcarboxylate were purified by the above chromatographic procedure and then further purified by distillation under reduced pressure, to afford the esters as colourless liquids. The cyclohexane ester mentioned above was further recrystallised from ethanol, using solid carbon dioxide, to give this ester as a colourless crystalline solid, which rapidly melted at room temperature.

Some products prepared by the above method, together with their liquid crystal transition temperature, are listed in Tables 1–4 below.

Spectroscopic analysis, thin layer chromatography, and gas liquid chromatography were carried out on all the esters prepared by the method to verify their structure and/or purity.

Examples of products of Step B1 are given in Tables 1–4 below.

In the Tables the following symbols are used:

N-I = nematic to isotropic liquid transition temperature
C-N = crystalline solid to nematic transition temperature
C-I = crystalline solid to isotropic liquid transition temperature
C-Ch = crystalline solid to cholesteric transition temperature
Ch-I = cholesteric to isotropic liquid transition temperature
$C-S_A$ = crystal to smectic A transition temperature
$S_A$-N = smectic A to nematic transition temperature
$S_B$-$S_A$ = smectic B to smectic A transition temperature
$S_A$-I = smectic A to isotropic liquid transition temperature
( ) = monotropic transition temperature
[ ] = virtual transition temperature
(+)—= optically active compound having a positive optical rotation angle

TABLE 1

Compounds of the form R₃—⟨H⟩—COO—⟨F-phenyl⟩—R₁

(where ⟨H⟩ = trans 1,4-disubstituted cyclohexane ring)

| R₃ | R₁ | C-N or $C-S_A$ or C-I (°C.) | N-I (°C.) | Ch-I (°C.) | $S_A$-N (°C.) |
|---|---|---|---|---|---|
| CH₃ | n-C₃H₇ | 27 | [−27] | | |
| CH₃ | n-C₅H₁₁ | 13.5 | [−36] | | |
| CH₃ | n-C₇H₁₅ | 18.5 | [−24] | | |
| C₂H₅ | n-C₅H₁₁ | 23 | [−10] | | |
| C₂H₅ | n-C₇H₁₅ | 13 | (−5.5) | | |
| n-C₄H₉ | n-C₃H₇ | 10.5 | 10.9 | | |
| n-C₅H₁₁ | n-C₄H₉ | 10 | 23 | | |
| n-C₅H₁₁ | n-C₆H₁₃ | 10 | 32.8 | | |
| n-C₅H₁₁ | n-C₈H₁₇ | 25 | 39.4 | | |
| n-C₅H₁₁ | n-C₉H₁₉ | 38 | 43.8 | | |
| n-C₅H₁₁ | (+)-2 methylbutyl | 38 | | [−1] | |
| n-C₆H₁₃ | n-C₃H₇ | 22 | 29.6 | | |

TABLE 1-continued

Compounds of the form (where —⟨H⟩— trans 1,4-disubstituted cyclohexane ring)

| R₃ | R₁ | C-N or C-S_A or C-I (°C.) | N-I (°C.) | Ch-I (°C.) | S_A-N (°C.) |
|---|---|---|---|---|---|
| n-C₆H₁₃ | n-C₅H₁₁ | 11.5 | 34.3 | | |
| n-C₆H₁₃ | n-C₆H₁₃ | 11 | 30.7 | | |
| n-C₆H₁₃ | n-C₇H₁₅ | 22 | 38.9 | | |
| n-C₆H₁₃ | n-C₈H₁₇ | 16 | 36.2 | | |
| n-C₆H₁₃ | n-C₉H₁₉ | 28.5 | 43.0 | | |
| n-C₇H₁₅ | n-C₃H₇ | 30.5 | 39.2 | | |
| n-C₇H₁₅ | n-C₄H₉ | 14.5 | 24.1 | | |
| n-C₇H₁₅ | n-C₅H₁₁ | 24.5 | 43.4 | | |
| n-C₇H₁₅ | n-C₆H₁₃ | 18.5 | 37.8 | | |
| n-C₇H₁₅ | n-C₇H₁₅ | 30 | 46.4 | | |
| n-C₇H₁₅ | n-C₈H₁₇ | 33 | 45.0 | | |
| n-C₇H₁₅ | n-C₉H₁₉ | 37 | 49.3 | | |
| n-C₇H₁₅ | n-C₁₁H₂₃ | 42.5 | 52 | | 47 |
| n-C₇H₁₅ | (+)-2 methylbutyl | 26.5 | | (12.1) | |
| n-C₈H₁₇ | n-C₃H₇ | 21.5 | 38.5 | | |
| n-C₈H₁₇ | n-C₅H₁₁ | 23.5 | 41.0 | | |
| n-C₈H₁₇ | n-C₇H₁₅ | 22.5 | 44.0 | | |
| n-C₉H₁₉ | n-C₅H₁₁ | 41.0 | 47.7 | | |
| n-C₉H₁₉ | n-C₇H₁₅ | 34.0 | 49.3 | | |
| n-C₃H₇ | C₃H₇ | 32.5 | (19) | | |
| n-C₃H₇ | n-C₅H₁₁ | 36 | (26.5) | | |
| n-C₃H₇ | n-C₇H₁₅ | 27 | 30.3 | | |
| n-C₄H₉ | n-C₅H₁₁ | 10.5 | 16.1 | | |
| n-C₄H₉ | n-C₇H₁₅ | 16 | 26.7 | | |
| n-C₅H₁₁ | C₃H₇ | 30 | 30.7 | | |
| n-C₅H₁₁ | C₅H₁₁ | 17.5 | 35.0 | | |
| n-C₅H₁₁ | C₇H₁₅ | 33 | 41.4 | | |

TABLE 2

Compounds of the form

| R₂ | R₁ | C-N or C-I or C-Ch (°C.) | N-I (°C.) | Ch-I (°C.) |
|---|---|---|---|---|
| CH₃O | n-C₅H₁₁ | 28 | (20) | |
| n-C₄H₉O | n-C₅H₁₁ | 44 | (37.9) | |
| n-C₆H₁₃O | n-C₅H₁₁ | 28 | 37.0 | |
| n-C₃H₇ | n-C₇H₁₅ | 23 | [−7] | |
| n-C₄H₉ | n-C₅H₁₁ | 16 | [−14] | |
| n-C₅H₁₁ | n-C₅H₁₁ | 14 | (1.2) | |
| n-C₅H₁₁ | n-C₇H₁₅ | 24 | (4.2) | |
| n-C₅H₁₁ | n-C₃H₇ | 7.0 | [<−20] | |
| n-C₅H₁₁ | (+)-2-methylbutyl | 1.5 | | 4.7 |
| n-C₆H₁₃ | n-C₅H₁₁ | 19.5 | [−5] | |
| n-C₇H₁₅ | n-C₅H₁₁ | 19.0 | (4.3) | |
| n-C₇H₁₅ | (+)-2-methylbutyl | 27.0 | | (14.1) |

TABLE 3

Compounds of the form

| R₂ | R₁ | C-I (°C.) or C-N | N-I (°C.) | C-S_A | S_A-I |
|---|---|---|---|---|---|
| n-C₄H₉ | n-C₅H₁₁ | 2.7 | [<−9.0] | | |
| n-C₅H₁₁ | n-C₅H₁₁ | 15.0 | (−8.0) | | |
| CH₃O | n-C₄H₉ | 51.5 | | | |
| n-C₆H₁₃O | n-C₅H₁₁ | | | 39.5 | 48.6 |
| n-C₅H₁₁ | n-C₃H₇ | 33.5 | [14] | | |

TABLE 4

Compounds of the form

| R₃ | R₁ | C-I (°C.) | S_A-N (°C.) | S_B-S_A (°C.) | S_A-I (°C.) | N-I (°C.) |
|---|---|---|---|---|---|---|
| n-C₃H₇ | n-C₅H₁₁ | 26.5 | | | | (9.2) |
| n-C₄H₉ | n-C₅H₁₁ | 14.5 | (−3.7) | | | (7.4) |
| n-C₅H₁₁ | n-C₅H₁₁ | 27.5 | (18.7) | | | (26.3) |
| n-C₆H₁₃ | n-C₅H₁₁ | 29.0 | | | (24.7) | |
| n-C₇H₁₅ | n-C₅H₁₁ | 33.5 | | (21.7) | 34.4 | |
| n-C₅H₁₁ | n-C₃H₇ | 33.5 | | | | [14] |

EXAMPLE 2

Preparation of compounds as defined above wherein Z is R″₂, R″₂=alkanoyloxy or alkoxycarbonyloxy.

The following route is preferable used for the preparation of these compounds:

where R_A=alkyl.

STEP A2

4-Hydroxybenzoic acid is converted into the hydroxy ester by a method as described by Lowrance (Tetrahedron Lett. 1971, 3453) in which the reactants (4-hydroxybenzoic acid and the appropriate fluorophenol) are dissolved in toluene and heated in a Dean and Stark apparatus together with sulphuric acid and boric acid as catalysts.

STEP B2

The hydroxy ester is converted into the alkanoyl derivative by a standard esterification procedure using the appropriate acid chloride $R_4COCl$.

STEP C2

The hydroxy ester is converted into the alkyloxy carbonyloxy derivative by a standard esterification procedure using the appropriate alkyl chloroformate $ClCOOR_4$.

A liquid crystal device embodying the invention will now be described by way of example only with reference to the accompanying drawings of which.

Figure 1:
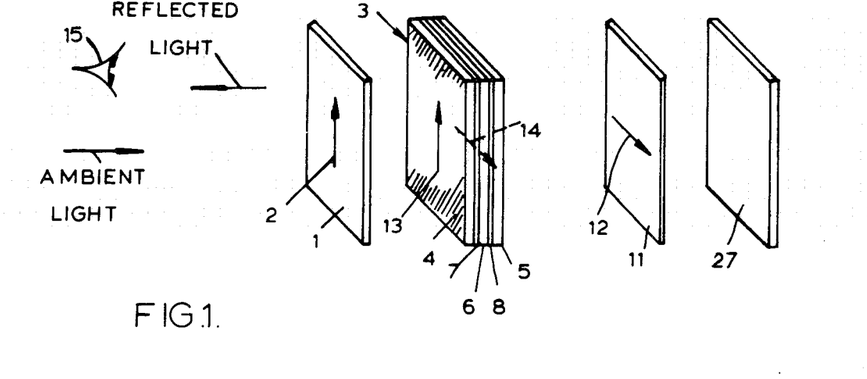
FIG. 1 is an exploded view of a twisted nematic display.

As shown in FIG. 1 a 'twisted nematic' type display includes a polariser 1 arranged with its polarisation axis 2 vertical. A liquid crystal cell 3 comprises two glass slides 4, 5 containing a layer of liquid crystal 6, consisting basically of a nematic material which may contain a small proportion (eg 1%) of a cholesteric compound. Electrodes 7, 8, eg of tin oxide, are arranged on the inner faces of the slides 4, 5. Behind the cell 3 is an analyser or second polariser 11 arranged with its polarisation axis 12 horizontal. A brushed aluminium reflector 27 is behind the analyser 11.

Prior to assembling the cell the slides 4, 5 are coated on their inner faces with silicon monoxide or magnesium fluoride. This coating is formed by evaporating a stream of eg silicon monoxide onto the slide at an angle of about 5° to the surface as for example described in UK Patent Specification No 1,454,296. On assembly the slides are arranged with the evaporation direction on two slides 4, 5 at 90° to one another. With such a coating liquid crystal molecules at the coated surfaces lie in a single direction (parallel to the evaporation direction) and at an angle of about 25° to 35° typically about 30° to the slide surface. As a result the liquid crystal molecules progressively twist from one slide 4 to the other slide 5 in a twisted homogeneous texture. Thus the plane of plane polarised light is rotated through 90° on passing through the cell 3 providing the direction 13 of the molecules at the surface of the slide 4, 5 is parallel (or perpendicular) to the polarisers axis 2, 12 respectively. Thus when zero voltage is applied to the cell light passes through the analyser 1, cell 3 and analyser 11, and is then reflected back to an observer 15.

When a suitable voltage is applied between the electrodes 7, 8 the molecules between the electrodes are caused to align parallel to the applied field and light transmitted by the polariser is transmitted without rotation to the analyser 11. Since the polariser and analyser 11 are crossed no light is transmitted to the reflector and no light is reflected back to the observer at those parts of the cell 3 between electrodes 7,8 which therefore appear dark on a lighter background. Thus by shaping each electrode 7, 8 into say seven discrete parts separately connectable to a voltage source the numbers 0 to 9 may be displayed.

Figure 2:
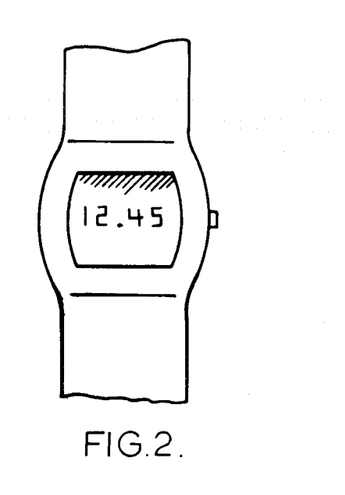
FIG. 2 is a front view of a watch having a twisted nematic liquid crystal display constructed as shown in FIG. 1.
Figure 3:
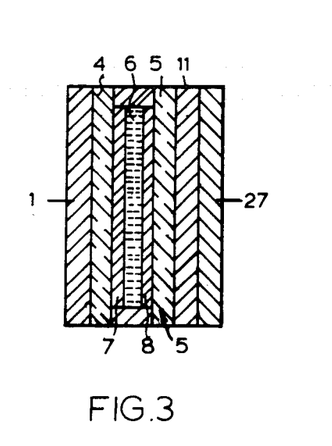
FIG. 3 is a sectional view of the display part of the watch in FIG. 2 but drawn to an enlarged scale.

In the watch display of FIGS. 2, 3 the electrodes 7, 8 are arranged to provide four seven bar numeric characters plus a period dot which may be arranged to pulse once per second.

The voltage required to align the molecules parallel to the applied field, is the 'ON' state, is dependent on layer 6 thickness, materials used, temperature and surface treatment of the slides 4, 5. A typical thickness of layer is 12 $\mu$m. The material used must be stable over the temperatures of use ie ambient temperatures which can be assumed constant for comparison purposes. A surface treatment ie evaporation of silicon monoxide at 5° giving large tilt eg 30° of molecules reduces the voltage necessary to turn the cell 'ON' at the expense of a degraded contrast or speed.

In typical watch displays using twisted nematic liquid crystal displays a 1.5 volt battery is used to drive the oscillator and logic circuits of the watch and an up converter is used to raise the voltage to 3.0 volts for operating the display.

Material embodying the invention suitable for use as the liquid crystal 6 is:

Mixture B — 60% by weight

39% by weight

1% by weight (known).

Addition of the ester to the biphenyl Mixture B reduces the temperature dependence of the threshold voltage of the device described above. This effect, and the improvement in multiplexibility of a matrix-type liquid crystal display of the twisted nematic kind, using a mixture of this form, is further described in a copending UK Patent Application.

In an alternative embodiment of the invention (cholesteric-to-nematic) phase change effect device incorporates a material as defined above.

A cell is prepared containing a long helical pitch cholesteric material sandwiched between electrode-bearing glass slides as in the twisted nematic cell described above. However the polarisers and surface preparations for homogeneous alignment, eg treatment of the glass slide surfaces with SiO, are not used in this case.

If the glass slides are untreated and the liquid crystal material has a positive dielectric anisotropy ($\Delta\epsilon$) the liquid crystal material is in a twisted focal conic molecular texture in the OFF state which scatters light. The effect of an electric field applied between a pair of electrodes on the respective inner surface of the glass slides is to convert the region of liquid crystal material between the electrodes into the ON state which is a homeotropic nematic texture which is less scattering than the OFF state.

If the inner glass slide surfaces are treated, eg with a coating of lecithin, to give alignment perpendicular to those surfaces, and the liquid crystal material has $\Delta\epsilon$ negative the material in the OFF state is in a homeotropic texture which has little scattering effect on incident light. If an electric field is applied between a pair of electrodes on the respective inner surfaces of the glass slides the region of liquid crystal material between the electrodes is converted to a twisted homogeneous texture which scatters light (the ON state).

The contrast between the two states in each case may be enhanced by the addition of a small amount of a suitable pleochroic dye (eg 1% by weight of 1,5-bis-4′-n-butylphenylamino anthraquinone in the case where $\Delta\epsilon$ is positive) to the liquid crystal material.

A suitable positive dielectric anisotropy material embodying the invention for use in a phase change effect device is:

A suitable negative dielectric anisotropy material embodying the invention for use in a phase change effect device is:

45% by weight

-continued

46% by weight

10% by weight

1% by weight

($R_C$ = (+)2-methylbutyl)

The esters in the above device mixtures wherein X=H and Y=F may be replaced by, or substituted partly in weight percentage by esters wherein Y=H and X=F (see Formula I above), eg

We claim:

1. A liquid crystal ester compound having a molecular structure formula (II)

wherein X is fluorine and Y is hydrogen or X is hydrogen and Y is fluorine, $R_1$ is an alkyl group and Z is where $R_3$ is an alkyl group.

2. A compound as claimed in claim 1 and wherein X is hydrogen and Y is fluorine.

3. A compound as claimed in claim 1 and wherein X is fluorine and Y is hydrogen.

4. A compound as claimed in claim 2 and wherein $R_1$ is n—$C_7H_{15}$ and $R_3$ is n—$C_3H_7$.

5. A compound as claimed in claim 2 and wherein $R_1$ is n—$C_5H_{11}$ and $R_3$ is n—$C_4H_9$.

6. A compound as claimed in claim 2 and wherein $R_1$ is n—$C_7H_{15}$ and $R_3$ is n—$C_4H_9$.

7. A compound as claimed in claim 2 and wherein $R_1$ is n—$C_3H_7$ and $R_3$ is n—$C_5H_{11}$.

8. A compound as claimed in claim 2 and wherein $R_1$ is n—$C_5H_{11}$ and $R_3$ is n—$C_5H_{11}$.

9. A compound as claimed in claim 2 and wherein $R_1$ is n—$C_7H_{15}$ and $R_3$ is n—$C_5H_{11}$.

10. A compound as claimed in claim 2 and wherein $R_1$ is n—$C_3H_7$ and $R_3$ is n—$C_4H_9$.

11. A compound as claimed in claim 2 and wherein $R_1$ is n—$C_4H_9$ and $R_3$ is n—$C_5H_{11}$.

12. A compound as claimed in claim 2 and wherein $R_1$ is n—$C_6H_{13}$ and $R_3$ is n—$C_5H_{11}$.

13. A compound as claimed in claim 2 and wherein $R_1$ is n—$C_8H_{17}$ and $R_3$ is n—$C_5H_{11}$.

14. A compound as claimed in claim 2 and wherein $R_1$ is n—$C_9H_{19}$ and $R_3$ is n—$C_5H_{11}$.

15. A compound as claimed in claim 2 and wherein $R_1$ is (+)-2-methylbutyl and $R_2$ is n—$C_5H_{11}$.

16. A compound as claimed in claim 2 and wherein $R_1$ is n—$C_3H_7$ and $R_3$ is n—$C_6H_{13}$.

17. A compound as claimed in claim 2 and wherein $R_1$ is n—$C_5H_{11}$ and $R_3$ is n—$C_6H_{13}$.

18. A compound as claimed in claim 2 and wherein $R_1$ is n—$C_6H_{13}$ and $R_3$ is n—$C_6H_{13}$.

19. A compound as claimed in claim 2 and wherein $R_1$ is n—$C_7H_{15}$ and $R_3$ is n—$C_6H_{13}$.

20. A compound as claimed in claim 2 and wherein $R_1$ is n—$C_8H_{17}$ and $R_3$ is n—$C_6H_{13}$.

21. A compound as claimed in claim 2 and wherein $R_1$ is n—$C_9H_{19}$ and $R_3$ is n—$C_6H_{13}$.

22. A compound as claimed in claim 2 and wherein $R_1$ is n—$C_3H_7$ and $R_3$ is n—$C_7H_{15}$.

23. A compound as claimed in claim 2 and wherein $R_1$ is n—$C_5H_{11}$ and $R_3$ is n—$C_7H_{15}$.

24. A compound as claimed in claim 2 and wherein $R_1$ is n—$C_6H_{13}$ and $R_3$ is n—$C_7H_{15}$.

25. A compound as claimed in claim 2 and wherein $R_1$ is n—$C_7H_{15}$ and $R_3$ is n—$C_7H_{15}$.

26. A compound as claimed in claim 2 and wherein $R_1$ is n—$C_8H_{17}$ and $R_3$ is n—$C_7H_{15}$.

27. A compound as claimed in claim 2 and wherein $R_1$ is n—$C_9H_{19}$ and $R_3$ is n—$C_7H_{15}$.

28. A compound as claimed in claim 2 and wherein $R_1$ is n—$C_{11}H_{23}$ and $R_3$ is n—$C_7H_{15}$.

29. A compound as claimed in claim 2 and wherein $R_1$ is (+)-2-methylbutyl and $R_3$ is n—$C_7H_{15}$.

30. A compound as claimed in claim 2 and wherein $R_1$ is n—$C_3H_7$ and $R_3$ is n—$C_8H_{17}$.

31. A compound as claimed in claim 2 and wherein $R_1$ is n—$C_5H_{11}$ and $R_3$ is n—$C_8H_{17}$.

32. A compound as claimed in claim 2 and wherein $R_1$ is n—$C_7H_{15}$ and $R_3$ is n—$C_8H_{17}$.

33. A compound as claimed in claim 2 and wherein $R_1$ is n—$C_5H_{11}$ and $R_3$ is n—$C_9H_{19}$.

34. A compound as claimed in claim 2 and wherein $R_1$ is n—$C_7H_{15}$ and $R_3$ is n—$C_9H_{19}$.

* * * * *